US010142363B2

United States Patent
Carter

(10) Patent No.: US 10,142,363 B2
(45) Date of Patent: Nov. 27, 2018

(54) SYSTEM FOR MONITORING AND ADDRESSING EVENTS BASED ON TRIPLET METRIC ANALYSIS

(71) Applicant: Bank of America Corporation, Charlotte, NC (US)

(72) Inventor: Lonnie Jason Carter, Kingwood, TX (US)

(73) Assignee: Bank of America Corporation, Charlotte, NC (US)

(*) Notice: Subject to any disclaimer, the term of this patent is extended or adjusted under 35 U.S.C. 154(b) by 114 days.

(21) Appl. No.: 15/191,066

(22) Filed: Jun. 23, 2016

(65) Prior Publication Data

US 2017/0374092 A1 Dec. 28, 2017

(51) Int. Cl.
*H04L 29/06* (2006.01)
*G06F 17/30* (2006.01)

(52) U.S. Cl.
CPC .... *H04L 63/1433* (2013.01); *G06F 17/30554* (2013.01)

(58) Field of Classification Search
CPC ........... H04L 63/1433; G06F 17/30554; G06F 17/30864
See application file for complete search history.

(56) References Cited

U.S. PATENT DOCUMENTS

| | | | | |
|---|---|---|---|---|
| 8,201,257 B1 * | 6/2012 | Andres | ................. | G06F 21/568 726/23 |
| 2005/0222820 A1 * | 10/2005 | Chung | ............. | G08B 13/19645 702/188 |
| 2006/0015747 A1 * | 1/2006 | Van de Ven | ........ | H04L 63/0428 713/188 |
| 2011/0178942 A1 * | 7/2011 | Watters | .................. | G06Q 10/06 705/325 |
| 2011/0277034 A1 * | 11/2011 | Hanson | ................. | G06F 21/554 726/25 |
| 2012/0233698 A1 * | 9/2012 | Watters | ................. | G06F 21/554 726/25 |
| 2014/0282965 A1 * | 9/2014 | Sambamurthy | ......... | G06F 21/32 726/7 |
| 2015/0088597 A1 * | 3/2015 | Doherty | ............. | G06Q 10/0635 705/7.28 |
| 2015/0205965 A1 * | 7/2015 | Kilgallon | ............... | G06F 21/577 726/25 |
| 2017/0048266 A1 * | 2/2017 | Hovor | ................. | H04L 63/1433 |
| 2017/0310690 A1 * | 10/2017 | Mestha | ............... | H04L 63/1425 |
| 2018/0089500 A1 * | 3/2018 | Friedman | ........... | G06K 9/00288 |

* cited by examiner

*Primary Examiner* — Daniel B Potratz
*Assistant Examiner* — Vu V Tran
(74) *Attorney, Agent, or Firm* — Michael A. Springs; Moore & Van Allen PLLC; Nicholas C. Russell

(57) ABSTRACT

Embodiments of the present invention provide a system for monitoring and addressing events based on triplet metric analysis. In some embodiments, the system transmits control signals to cause a vendor database system to continuously monitor a vendor database for a new data input and, in response to identifying the new data input, automatically transmits the new data input back to the system. From the new data input, the system may identify actors, actor values, means, means values, assets, and asset values associated with certain events. The system may then determine a model based on the new data input and transmit control signals configured to cause a computing device system associated with a user to display a three-dimensional representation of the model.

12 Claims, 9 Drawing Sheets

SYSTEM FOR MONITORING AND ADDRESSING EVENTS BASED ON TRIPLET METRIC ANALYSIS

FIELD OF THE INVENTION

The present invention is generally directed to a system for monitoring and addressing events based on triplet metric analysis, as well as transmitting and displaying dynamic three-dimensional representative models for the triplet metric analysis.

BACKGROUND

Event analysis currently involves receiving a large number of event reports that detail actors, methods of acting, and targeted assets. These event reports may be provided by multiple vendors and internal sources that present information in a generally unformatted manner (e.g., in prose form), or in different formats that are difficult to perform efficient information extraction upon.

The overload of event information written in prose form creates a fundamental problem of extracting meaningful metrics and dynamically presenting the metrics and their changes in real time. Therefore, a need exists to monitor event reports that are in prose form, analyze the event reports based on certain metrics, display the certain metrics in a digestible format, and dynamically update the displayed metrics as new event reports are analyzed.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for monitoring and addressing events based on triplet metric analysis. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve continuously monitoring a vendor database for a new data input comprising at least a threat actor, a threat means, and a targeted asset. Based on monitoring the vendor database, the system may identify the new data input. In some embodiments, the system may identify a threat actor value based on a comparison of the threat actor to an actor value database, identify a threat means value based on a comparison of the threat means to a means value database, and identify a targeted asset value based on a comparison of the targeted asset to an asset value database. Furthermore, the system may calculate a threat-based exposure model based at least on the identified threat actor value, the identified threat means value, and the identified targeted asset value. In response to calculating the threat-based exposure model, the system may transmit control signals configured to cause a computing device system associated with a user to display a three-dimensional representation of the threat-based exposure model.

Some embodiments of the three-dimensional representation of the threat-based exposure model comprise a two-dimensional display of the threat-based exposure model, wherein a vantage point of the threat-based exposure model is moveable about the two-dimensional display. In other embodiments, the threat-based exposure model comprises a virtual reality representation of the threat-based exposure model, and wherein the computing device associated with the user comprises a virtual reality device.

In some embodiments of the system, the system receives, from the user interface of the computing device associated with the user, instructions to print the threat-based exposure model and, in response to receiving instructions to print the threat-based exposure model, transmits control signals configured to cause a three-dimensional printer system to print the threat-based exposure model.

Additionally, in some embodiments of the system, the threat-based exposure model is defined as $R = |a \ v \ b| \sin(\theta) \sin(\varphi)$, where R is a threat-based exposure value calculated by the threat-based exposure model, a is the identified threat actor value, v is the identified threat means value, b is the identified targeted asset value, $\theta$ is a degree of relation between the threat actor and the threat means, and $\varphi$ is a degree of relation between the targeted asset and a combination of the threat actor and the threat means. In some such embodiments, the system calculates a total threat-based exposure value as a sum of R and a plurality of different threat-based exposure values associated with different combinations of threat actors, threat means, and targeted assets. Furthermore, in some embodiments, and in response to calculating the total threat-based exposure value, the system transmits control signals configured to cause the computing device system associated with the user to display a three-dimensional representation of the total threat-based exposure value.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
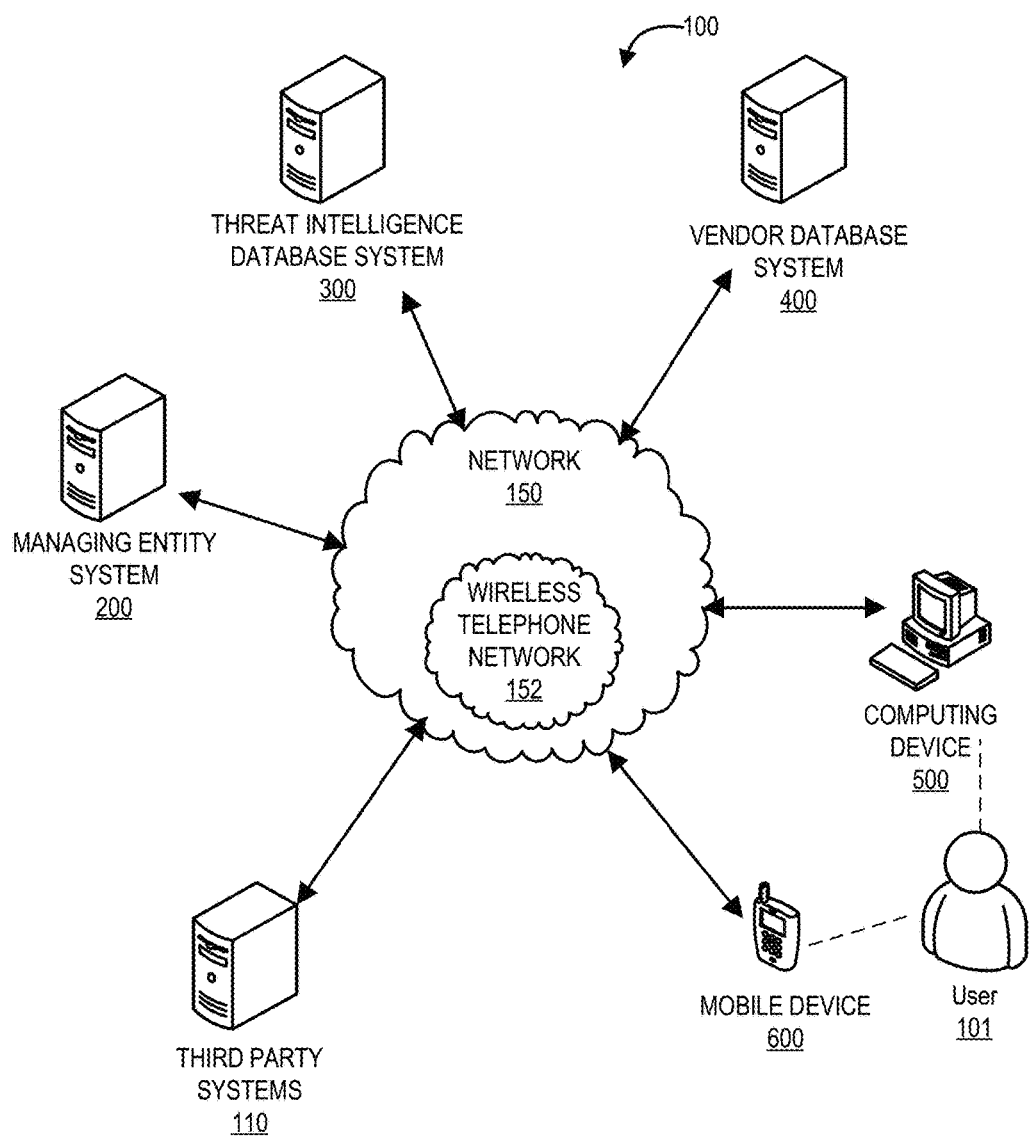
Figure 2:
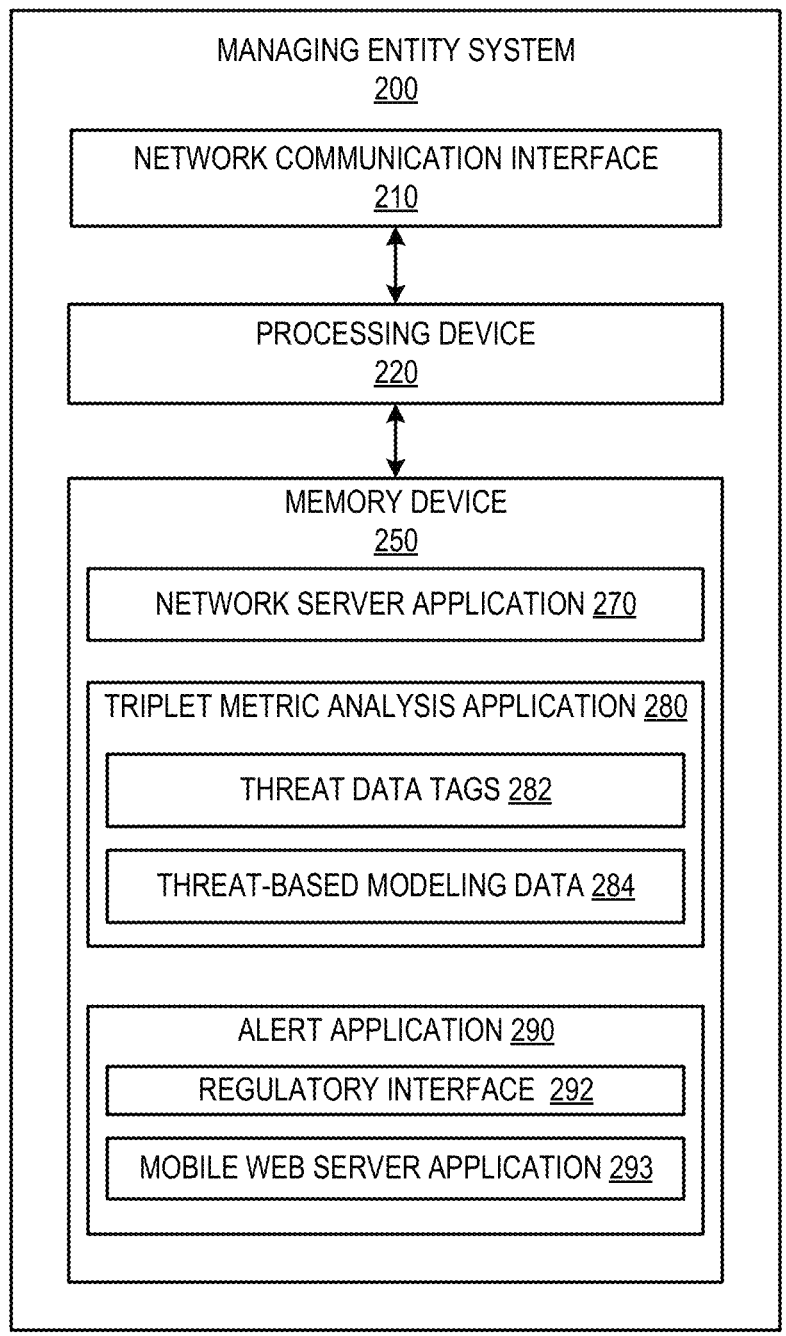
Figure 3:
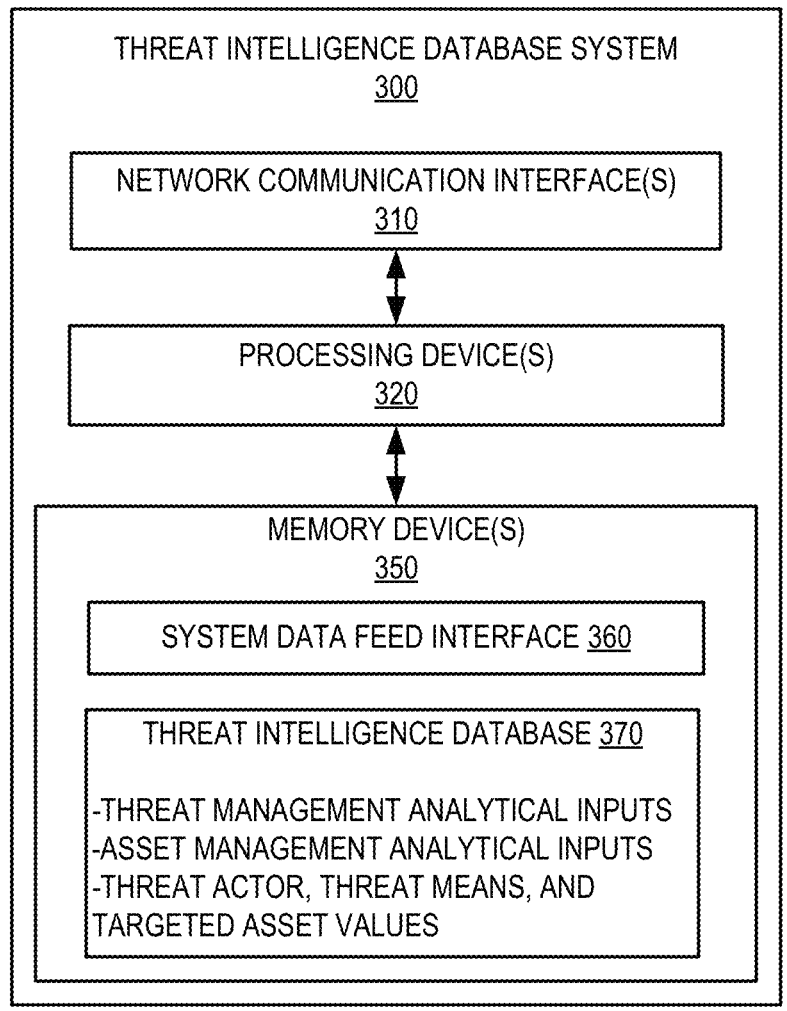
Figure 4:
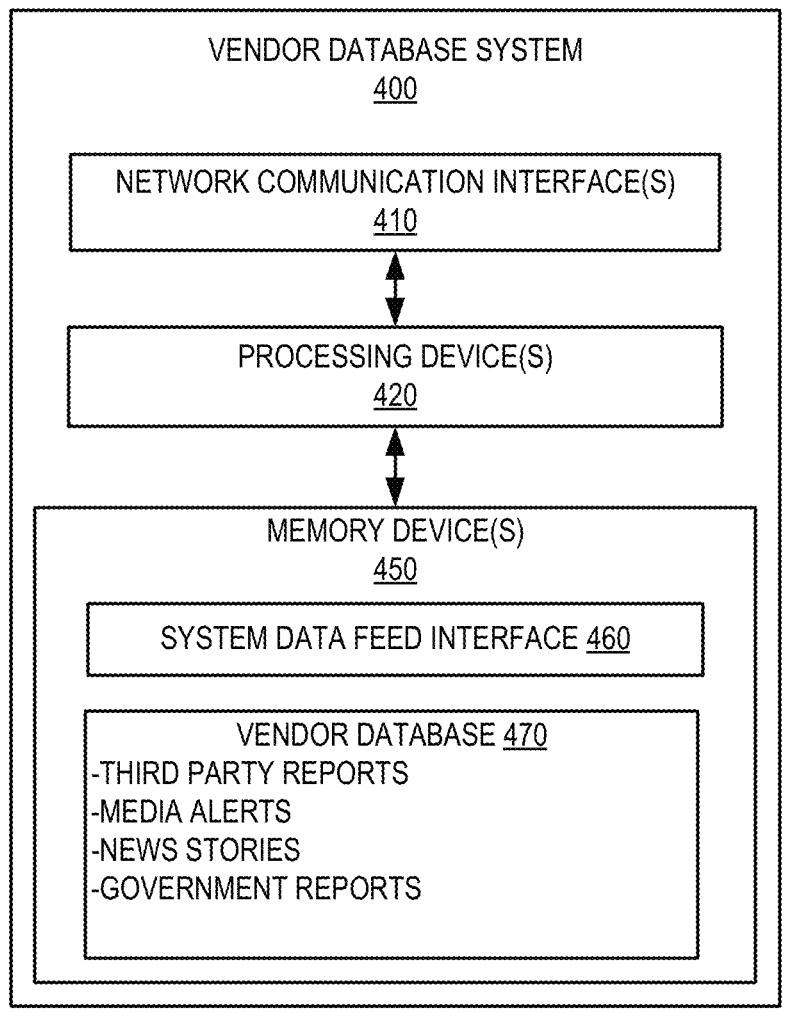
Figure 5:
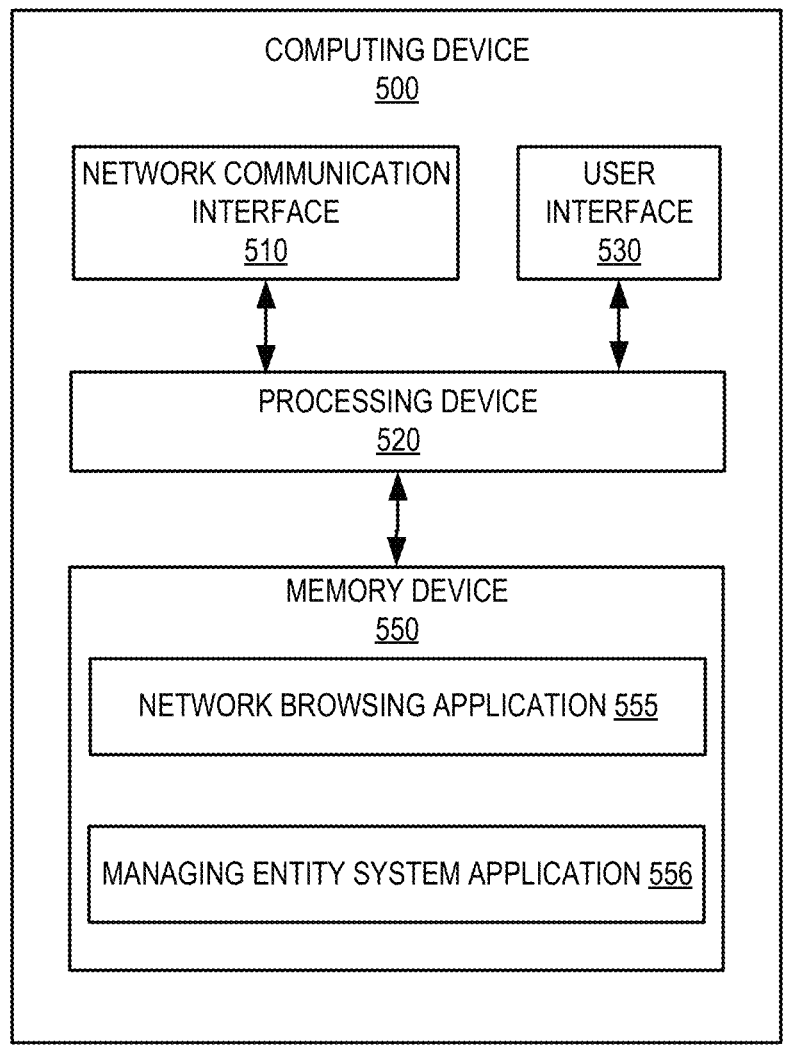
Figure 6:
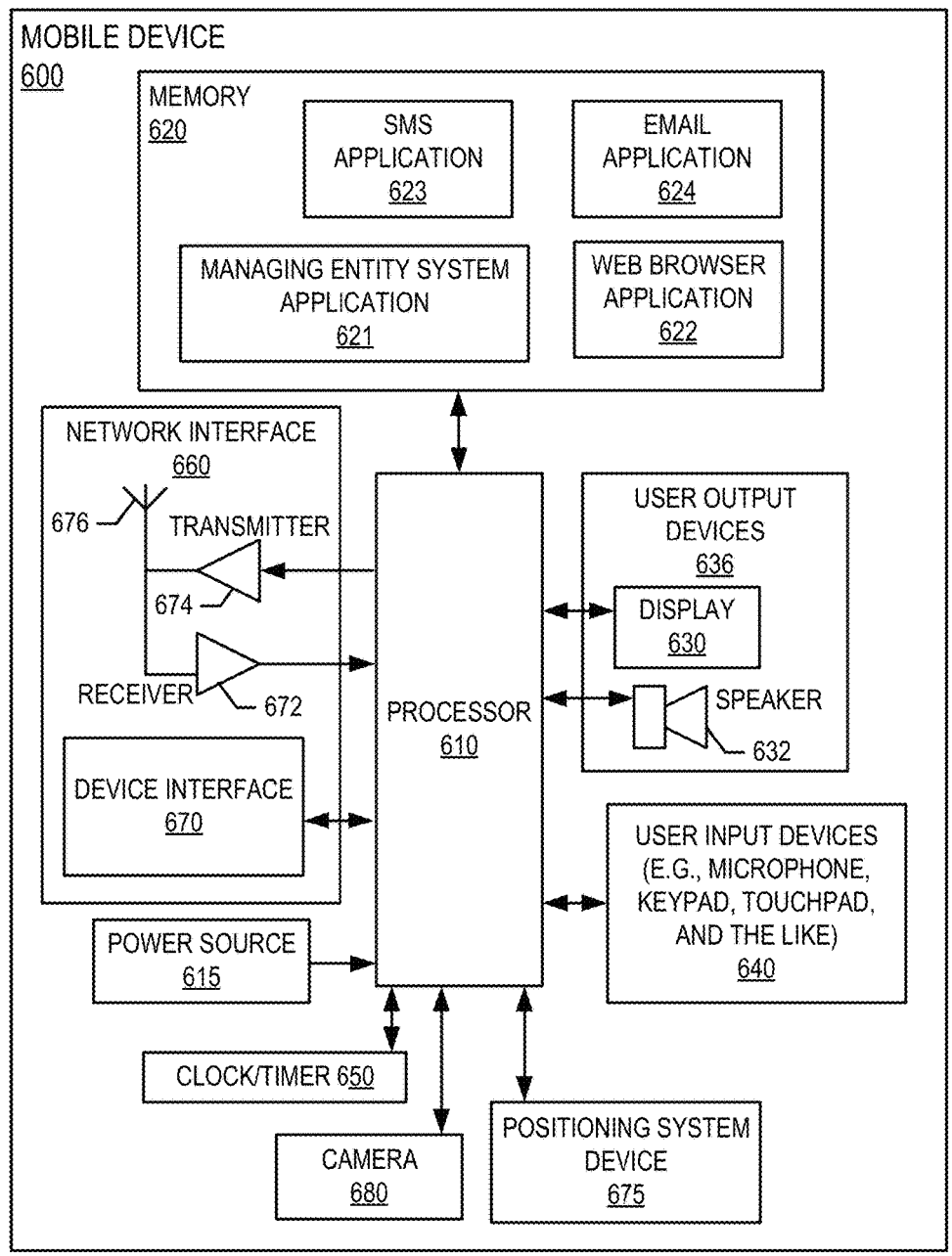
Figure 7:
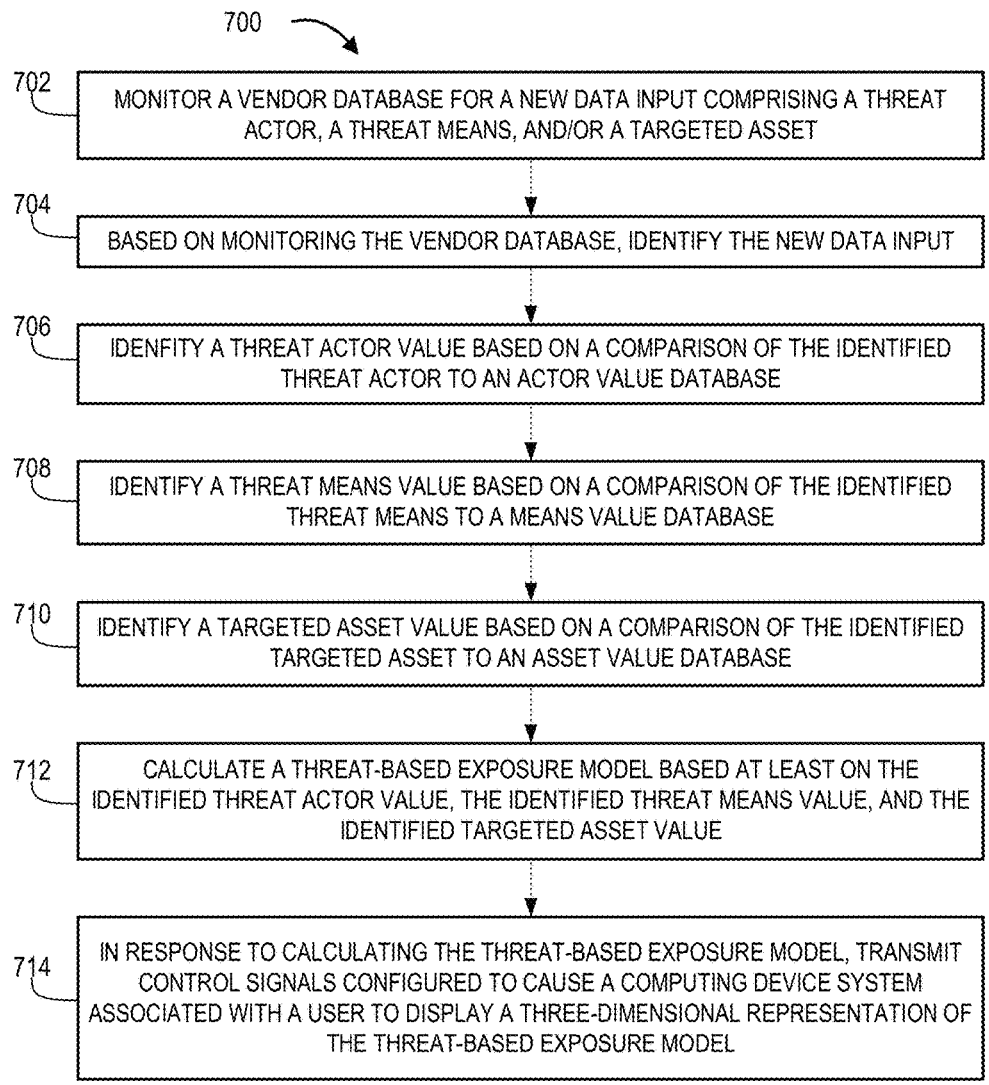
Figure 8:
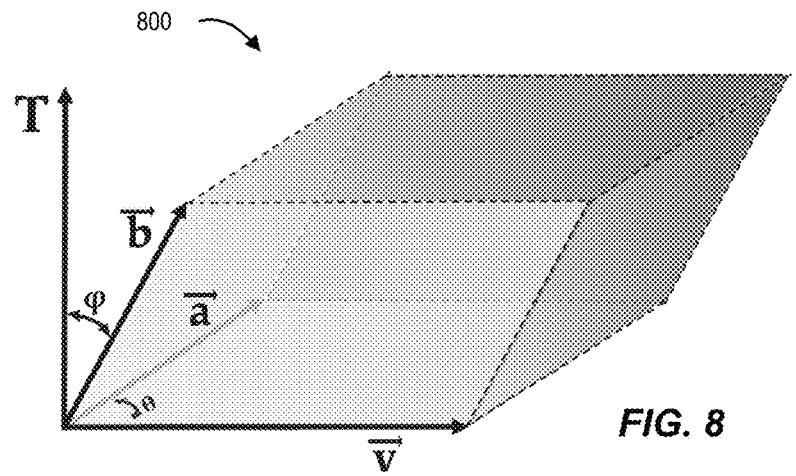
Figure 9:
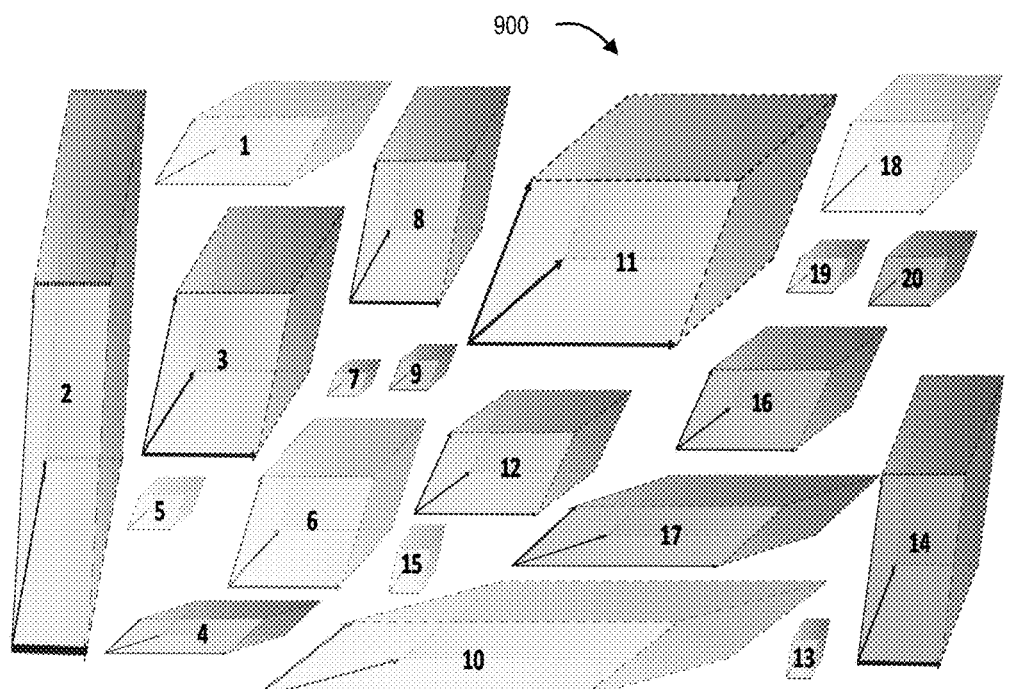
Figure 10:
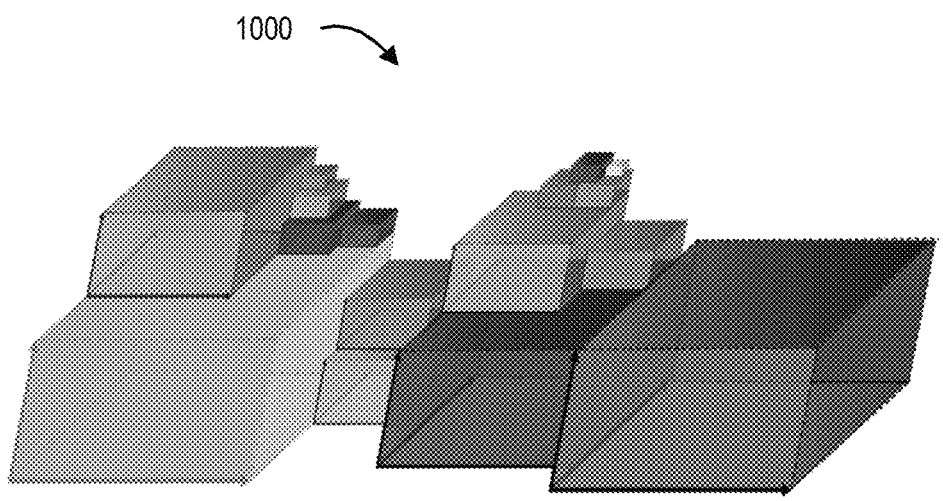

Having thus described embodiments of the invention in general terms, reference will now be made the accompanying drawings, wherein:

FIG. 1 provides a block diagram illustrating a system environment for monitoring and addressing events based on triplet metric analysis, in accordance with an embodiment of the invention;

FIG. 2 provides a block diagram illustrating the managing entity system of FIG. 1, in accordance with an embodiment of the invention;

FIG. 3 provides a block diagram illustrating the threat intelligence database system of FIG. 1, in accordance with an embodiment of the invention;

FIG. 4 provides a block diagram illustrating the vendor database system of FIG. 1, in accordance with an embodiment of the invention;

FIG. 5 is a diagram illustrating a computing device of FIG. 1, in accordance with embodiments of the invention;

FIG. 6 is a diagram illustrating a mobile device of FIG. 1, in accordance with embodiments of the invention;

FIG. 7 provides a flowchart illustrating a process for monitoring and addressing events based on triplet metric analysis, in accordance with an embodiment of the invention;

FIG. 8 is an illustration of a display for a threat-based exposure model, in accordance with an embodiment of the invention;

FIG. 9 is an illustration of a display for a threat-based exposure model, in accordance with an embodiment of the invention; and FIG. 10 is an illustration of a display for a threat-based exposure model, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

The term "managing entity," as used herein, refers to an organization or other entity that controls the system for monitoring threat intelligence data, managing dynamic threat-based exposure models, and automatically responding to threat events. In some embodiments, the managing entity is a financial institution, but the managing entity may also be any entity that could be affected by exposure to a threat event. In accordance with embodiments of the invention, the terms "financial institution" and "financial entity" include any organization that processes financial transactions including, but not limited to, banks, credit unions, savings and loan associations, investment companies, stock brokerages, assess management firms, insurance companies and the like. In specific embodiments of the invention, use of the term "bank" is limited to a financial entity in which account-bearing customers conduct financial transactions, such as account deposits, withdrawals, transfers and the like.

Embodiments of the present invention provide a system and method for monitoring and addressing threat-based exposure events based on triplet metric analysis. In some embodiments, the system transmits control signals to cause a vendor database system to continuously monitor a vendor database for a new data input and, in response to identifying the new data input, automatically transmits the new data input back to the system. From the new data input, the system may identify threat actors, threat actor values, threat means, threat means values, targeted assets, targeted asset values, degrees of association between the threat actors and the threat means, and degrees of exposure associated with the targeted assets and certain combinations of threat actors and threat means. The system may then determine a model based on the new data input and transmit control signals configured to cause a computing device system associated with a user to display a three-dimensional representation of the model.

FIG. 1 provides a block diagram illustrating a system and environment 100, in accordance with an embodiment of the invention. As illustrated in FIG. 1, the system environment 100 includes a managing entity system 200, a threat intelligence database system 300, a vendor database system 400, one or more computing devices 500 associated with one or more users 101, one or more computing devices 600 associated with the one or more users 101, and one or more third party systems 110.

As shown in the system environment 100, the managing entity system 200, the threat intelligence database system 300, the vendor database system 400, the computing devices 500, the mobile devices 600, and the third party system 110 are communicably connected via the network 150, which in some instances may comprise a wireless telephone network 152.

As used herein, the term "user" shall generally mean a person associated with the managing entity of the managing entity system 200. As such, a user 101 may be an employee, contractor, or other individual that conducts work for the managing entity. Additionally, a user 101 may be part of a third party's organization instead of the managing entity's organization. For example, a user 101 may be a manager of a government agency that collaborates with the managing entity for preparing for and/or addressing certain threat exposure scenarios. As such, each user 101 may receive threat-based exposure models, data, instructions, alerts, and the like, and may input data, responses, suggestions, authorizations, and the like via a user interface of a computing device 500 and/or a mobile device 600 associated with the user 101. While a single user 101 is shown in the system environment 100, it should be known that multiple users 101 may be associated with the system, where each user 101 is associated with one or more computing devices 500 and/or mobile devices 600.

As used herein, a "mobile device" 600 is any mobile communication device, such as a cellular telecommunications device (i.e., a cell phone or mobile phone), personal digital assistant (PDA), a mobile Internet accessing device, or other mobile device. The mobile devices 600, and their capability to interact with users 101 and other devices in the system environment 100 will be discusses in greater detail with regard to FIG. 6. The computing devices 500, and their capability to interact with users 101 and other devices in the system environment 100 will be discussed in greater detail with regard to FIG. 5.

The computing devices 500 and the mobile devices 600 are configured to communicate over a network 150 with a managing entity system 200 and, in some cases, a threat intelligence database system 300, a vendor database system 400, other computing devices 500, other mobile devices 600, and/or third party systems 110. The managing entity system 200, the threat intelligence database system 300, the vendor database system 400, the computing devices 500, and the mobile devices 600 are each described in greater detail below with reference to FIGS. 2-6. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

The managing entity system 200 is in network communication with other devices to receive and/or extract data feeds associated with threat intelligence and asset management (i.e., management of assets belonging or associated with the managing entity) at least from the threat intelligence database system 300 and the vendor database system 400. Additionally, the managing entity system 200 is capable of establishing secure electronic communication channels between itself, computing devices 500, mobile devices 600, and/or third party systems 110. As such, the managing entity system 200 is capable of transmitting instructions to these devices and systems to cause user interfaces of the computing devices 500, mobile devices 600, and third party systems 110 to display threat-based exposure models, data, charts, tables, trends, alerts, alarms, and the like, so users 101 associated with the system environment 100 may receive and access data and information provided by the managing entity system 200. In some embodiments, the managing entity system 200 automatically establishes one or more secure electronic communication channels in response to a triggering event, like an identification of a new piece of information from the vendor database system 400, a change in an asset value for an asset owned or managed by the managing entity 200, and the like. Similarly, the computing devices 500, the mobile devices 600, and the third party systems 110 are configured such that user 101 inputs into the user interfaces may be communicated along the secure electronic communication channel to the managing entity system 200 and/or other devices within the system environment 100.

The third party systems 110 may be configured to be controlled and managed by one or more third-party partners (not shown in FIG. 1) over the network 150. In other embodiments, the third party systems 110 are controlled and managed by a different division of the same parent company as the managing entity. In some embodiments, the managing entity system 200 provides security controls that regulate which devices of the system environment 100 are accessible by the third party systems 110, and/or which data or data types are accessible by the third party systems 110. In this way, the managing entity system 200 can allow for a third party to collaborate with the managing entity, but only to the extent that the third party has legal authority and/or to the extent that the managing entity deems necessary for a beneficial business or other collaborating partnership.

Similarly, each of the threat intelligence database system 300 and the vendor database system 400 may be owned and controlled by the same entity that controls the managing entity system 200 (e.g., the managing entity), or each may be controlled by one or more third parties. For example, a third party may provide a data feed associated with threat intelligence information that may affect the managing entity, and therefore this third party may have established a vendor database system 400 that the managing entity has included in its system environment 100. Additionally, the threat intelligence database system 300 may be a database or a ledger maintained by the managing entity system 200, such that the managing entity system 200 can continuously update the threat intelligence database based on threat intelligence and threat-based exposure analysis that is discussed in greater detail with regard to FIG. 7.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 250. In certain embodiments, the managing entity system 200 is operated by a first entity, such as a financial institution, while in other embodiments, the managing entity system 200 is operated by an entity other than a financial institution.

It should be understood that the memory device 250 may include one or more databases or other data structures/repositories. The memory device 250 also includes computer-executable program code that instructs the processing device 220 to operate the network communication interface 210 to perform certain communication functions of the managing entity system 200 described herein. For example, in one embodiment of the managing entity system 200, the memory device 250 includes, but is not limited to, a network server application 270, a triplet metric analysis application 280 which includes threat data tags 282 and threat-based modeling data 284, an alert application 290 which includes a regulatory interface 492, a mobile web server application 293, and other computer-executable instructions or other data. The computer-executable program code of the network server application 270 or the alert application 290 may instruct the processing device 220 to perform certain logic, data-processing, and data-storing functions of the managing entity system 200 described herein, as well as communication functions of the managing entity system 200.

Furthermore, as used herein, a "memory device" (e.g., memory device 250, memory device 350, and memory device 450) generally refers to a device or combination of devices that store one or more forms of computer-readable media and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

In some embodiments, threat intelligence data, asset management data, actor data, threat means data, and the like may be stored in a non-volatile memory in the memory devices 250, 350, and/or 450, distinct from instructions for executing one or more process steps discussed herein that may be stored in a volatile memory such as a memory directly connected or directly in communication with a processing device executing the instructions. In this regard, some or all the process steps carried out by the processing devices 220, 320, or 420 may be executed in real-time or near-real-time, thereby increasing the efficiency by which the processing device 220, 320, and/or 420 may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

In one embodiment, the triplet metric analysis application 280 includes threat data tags 282 and threat-based modeling data 284. The threat data tags may be known or identifiable keywords, data ranges, symbols, codes, and the like that refer to specific threat-based data identifiers. In some embodiments, the managing entity system 200 compares data from the threat intelligence database system 300 and/or the vendor database system 400, where the incoming data has been previously tagged by the managing entity, a third party vendor, or through a data extraction and/or analysis technique. The threat data tags 282 may be used to group threat data in later steps carried out by the managing entity system 200, such that threat data can be compared based on the tagged categories (e.g., geographical location information, time-based information, frequency information, age information, experience information, associations with certain organizations or entities, and the like). The threat-based modeling data 284 may comprise algorithms, associations, and other threat data specific logic for analyzing threat intelligence data and generating threat-based exposure models based on the analyzed threat intelligence data. The network server application 270 and the alert application 290 are configured to invoke or use the triplet metric analysis application 280, the threat data tags 282, the threat-based modeling data 284, and the regulatory interface 292 when communicating through the network communication interface 210 with computing devices 500 and/or mobile devices 600 of the users 101.

As used herein, a "communication interface" generally includes a modem, server, transceiver, and/or other device for communicating with other devices on a network, and/or a user interface for communicating with one or more customers. Referring again to FIG. 1, the network communication interface 210 is a communication interface having one or more communication devices configured to communicate with one or more other devices on the network 150, such as the threat intelligence database system 300, the vendor database system 400, one or more computing devices 500, one or more of the mobile devices 600, the third party systems 110, and the like. The processing device 220 is configured to use the network communication interface 210 to transmit and/or receive data and/or commands to and/or from the other devices connected to the network 150.

FIG. 3 provides a block diagram illustrating a threat intelligence database system 300, in accordance with embodiments of the invention. As illustrated in FIG. 3, the threat intelligence database system 300 generally includes, but is not limited to, a network communication interface 310, one or more processing devices 320, and one or more memory devices 350. The processing device 320 is operatively coupled to the network communication interface 310 and the memory device 350. In one embodiment of the threat intelligence database system 300, the memory device 350 stores, but is not limited to, a system data feed interface 360 and threat intelligence database 370. In some embodiments, the threat intelligence database 370 stores data including, but not limited to, threat management analytical inputs, asset management analytical inputs, threat actor values, threat means values, asset values. In one embodiment of the invention, both the system data feed interface 360 and the threat intelligence database 370 may associate with applications having computer-executable program code that instructs the processing device 320 to operate the network communication interface 310 to perform certain communication functions involving the threat intelligence database 370 described herein. In one embodiment, the computer-executable program code of an application associated with the threat intelligence database 370 may also instruct the processing device 320 to perform certain logic, data processing, and data storing functions of the application associated with the threat intelligence database 370 described herein.

The network communication interface 310 is a communication interface having one or more communication devices configured to communicate with one or more other devices on the network 150. The processing device 320 is configured to use the network communication interface 310 to receive information from and/or provide information and commands to mobile devices 600, computing devices 700, third party systems 145, the managing entity system 200 and/or other devices via the network 150. In some embodiments, the processing device 320 also uses the network communication interface 310 to access other devices on the network 150, such as one or more web servers of one or more third-party data providers. In some embodiments, one or more of the devices described herein may be operated by a second entity so that the second entity controls the various functions involving the threat intelligence database system 300. For example, in one embodiment of the invention, although the managing entity system 200 is operated by a first entity (e.g., a financial institution), a second entity operates the threat intelligence database system 300 that stores received data in the threat intelligence database 370.

As described above, the processing device 320 is configured to use the network communication interface 310 to gather data, such as data associated with threat management of the managing entity that can be stored in the threat intelligence database 370 from various data sources. The processing device 320 stores the data that it receives in the threat intelligence database 370 within the memory device 350. The system data feed interface 360 may either continuously transmit data from the threat intelligence database 370 to the managing entity system 200, or the system data feed interface 360 may be configured to be continuously accessible by the managing entity system such that data from the threat intelligence database 370 may be continuously accessed, extracted, and/or analyzed.

FIG. 4 provides a block diagram illustrating a vendor database system 400, in accordance with embodiments of the invention. As illustrated in FIG. 4, the vendor database system 400 generally includes, but is not limited to, a network communication interface 410, one or more processing devices 420, and one or more memory devices 450. The processing device 420 is operatively coupled to the network communication interface 410 and the memory device 450. In one embodiment of the vendor database system 400, the memory device 450 stores, but is not limited to, a system data feed interface 460 and vendor database 470. In some embodiments, the vendor database 470 stores data including, but not limited to, third party reports, media alerts, news stories, government reports, and the like. In one embodiment of the invention, both the system data feed interface 460 and the vendor database 470 may associate with applications having computer-executable program code that instructs the processing device 420 to operate the network communication interface 410 to perform certain communication functions involving the vendor database 470 described herein. In one embodiment, the computer-executable program code of an application associated with the vendor database 470 may also instruct the processing device 420 to perform certain logic, data processing, and data storing functions of the application associated with the vendor database 470 described herein.

The network communication interface 410 is a communication interface having one or more communication devices configured to communicate with one or more other devices on the network 150. The processing device 420 is configured to use the network communication interface 410 to receive information from and/or provide information and commands to mobile devices 600, computing devices 700, third party systems 145, the managing entity system 200 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a third party entity so that the third party entity controls the various functions involving the vendor database system 400. For example, in one embodiment of the invention, although the managing entity system 200 is operated by a first entity (e.g., a financial institution), and a second entity operates the vendor database system 400 that stores received data in the vendor database 470. In some embodiments, multiple third party entities each control one or more vendor database systems 400, such that multiple third party vendor data feeds are available to the managing entity system 200.

As described above, the processing device 420 is configured to use the network communication interface 410 to gather data, such as data associated with threat intelligence and threat-based exposure analysis, third party reports, media alerts, news stories, government reports, and the like, that can be stored in the vendor database 470 from various data sources. The processing device 420 stores the data that it receives in the vendor database 470 within the memory device 450. The system data feed interface 460 may either continuously transmit data from the vendor database 470 to the managing entity system 200, or the system data feed interface 460 may be configured to be continuously accessible by the managing entity system such that data from the vendor database 470 may be continuously accessed, extracted, and/or analyzed.

Referring now to FIG. 5, the computing devices 500 associated with one or more of the users 101 (namely the responders 121, the specialists 131, and the partners 141) also include various features, such as a network communication interface 510, a processing device 520, a user interface 530, and a memory device 550. As described above, multiple computing devices 500 may be used within the system 100, where each computing device 500 is associated with one or more of the users 101, namely one or more of the responders 121, the specialists 131, and/or the partners 141. In portions of this application, a single computing device 500 is mentioned or described, but it should be known that multiple computing devices 500 are contemplated, with each computing device 500 having at least a portion of the embodiments described herein. The network communication interface 510 includes a device that allows the computing device 500 to communicate over the network 150 (shown in FIG. 1). In one embodiment of the invention, a network browsing application 555 provides for a user to establish network communication with a managing entity system 200, one or more mobile devices such as the mobile devices 600 (shown in FIG. 1), and/or third party systems 110 for the purpose of transmitting data, user 101 input, and the like, in accordance with embodiments of the invention. Additionally, a managing entity system application 556 may present threat-based exposure models, three-dimensional models, threat-based heat maps, reports, alerts, alarms, and the like, to devices, systems, and/or users 101 in accordance with embodiments of the invention.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in non-transitory computer-readable medium, and/or by having one or more application-specific circuits perform the function.

As used herein, a "user interface" 530 generally includes a plurality of interface devices and/or software that allow a customer (e.g., the user 110) to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from a user 101 or output data to a user 101. These input and output devices may include a display, mouse, keyboard, button, touchpad, touch screen, microphone, speaker, LED, light, joystick, switch, buzzer, bell, and/or other customer input/output device for communicating with one or more users 101.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating a user's 101 mobile device 600 of FIG. 1 in more detail, in accordance with embodiments of the invention. As described above, multiple mobile devices 600 may be used within the system 100, where each mobile device 600 is associated with one or more of the users 101. In portions of this application, a single mobile device 600 is mentioned or described, but it should be known that multiple mobile devices 600 are contemplated, with each mobile device 600 having at least a portion of the embodiments described herein. In one embodiment of the invention, the mobile device 600 is a mobile telephone. However, it should be understood that a mobile telephone is merely illustrative of one type of mobile device 600 that may benefit from, employ, or otherwise be involved with embodiments of the present invention and, therefore, should not be taken to limit the scope of embodiments of the present invention. Other types of mobile devices 600 may include portable digital assistants (PDAs), pagers, mobile televisions, gaming devices, laptop computers, cameras, video recorders, audio/video player, radio, GPS devices, or any combination of the aforementioned.

Some embodiments of the mobile device 600 include a processor 610 communicably coupled to such devices as a memory 620, user output devices 636, user input devices 640, a network interface 660, a power source 615, a clock or other timer 650, a camera 680, and a positioning system device 675. The processor 610, and other processors described herein, generally include circuitry for implementing communication and/or logic functions of the mobile device 600. For example, the processor 610 may include a digital signal processor device, a microprocessor device, and various analog to digital converters, digital to analog converters, and/or other support circuits. Control and signal processing functions of the mobile device 600 are allocated between these devices according to their respective capabilities. The processor 610 may also include the functionality to encode and interleave messages and data prior to modulation and transmission. The processor 610 can additionally include an internal data modem. Further, the processor 610 may include functionality to operate one or more software programs, which may be stored in the memory 620. For example, the processor 610 may be capable of operating a connectivity program, such as a web browser application 622. The web browser application 622 may then allow the mobile device 600 to transmit and receive web content, such as, for example, location-based content and/or other web page content, according to a Wireless Application Protocol (WAP), Hypertext Transfer Protocol (HTTP), and/or the like.

The processor 610 is configured to use the network interface 660 to communicate with one or more other devices on the network 150. In this regard, the network interface 660 includes an antenna 676 operatively coupled to a transmitter 674 and a receiver 672 (together a "transceiver"). The processor 610 is configured to provide signals to and receive signals from the transmitter 674 and receiver 672, respectively. The signals may include signaling information in accordance with the air interface standard of the applicable cellular system of the wireless telephone network 152. In this regard, the mobile device 600 may be configured to operate with one or more air interface standards, communication protocols, modulation types, and access types. By way of illustration, the mobile device 600 may be configured to operate in accordance with any of a number of first, second, third, and/or fourth-generation communication protocols and/or the like. For example, the mobile device 600 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 600 may also be configured to operate in accordance with non-cellular communication mechanisms, such as via a wireless local area network (WLAN) or other communication/data networks.

The network interface 660 may also include a device interface 670. The device interface 670 may include software, such as encryption software, and hardware, such as a modem, for communicating information to and/or from one or more systems or devices on a network 150 and connected with or that are part of the managing entity systems 200. For example, the mobile device 600 may be configured so that it can be used as an interface for interacting with computing devices 500, the managing entity system 200, and/or third party systems 110. For example, the mobile device 600 may wirelessly communicate encrypted survey results, tail event actions, and other information to a terminal of the network 150 or the managing entity system 200.

As described above, the mobile device 600 has a user interface that is, like other user interfaces described herein, made up of user output devices 636 and/or user input devices 640. The user output devices 636 include a display 630 (e.g., a liquid crystal display or the like) and a speaker 632 or other audio device, which are operatively coupled to the processor 610. The user input devices 640, which allow the mobile device 600 to receive data from a user 101, may include any of a number of devices allowing the mobile device 600 to receive data from the user 101, such as a keypad, keyboard, touch-screen, touchpad, microphone, mouse, joystick, other pointer device, button, soft key, and/or other input device(s). The user interface may also include a camera 680, such as a digital camera.

The mobile device 600 may also include a positioning system device 675 that is configured to be used by a positioning system to determine a location of the mobile device 600. For example, the positioning system device 675 may include a GPS transceiver. In some embodiments, the positioning system device 675 is at least partially made up of the antenna 676, transmitter 674, and receiver 672 described above. For example, in one embodiment, triangulation of cellular signals may be used to identify the approximate location of the mobile device 600. In other embodiments, the positioning system device 675 includes a proximity sensor or transmitter, such as an RFID tag, that can sense or be sensed by devices known to be located proximate a merchant or other location to determine that the mobile device 600 is located proximate these known devices.

The mobile device 600 further includes a power source 615, such as a battery, for powering various circuits and other devices that are used to operate the mobile device 600. Embodiments of the mobile device 600 may also include a clock or other timer 650 configured to determine and, in some cases, communicate actual or relative time to the processor 610 or one or more other devices.

The mobile device 600 also includes a memory 620 operatively coupled to the processor 610. As used herein, memory includes any computer readable medium (as defined herein below) configured to store data, code, or other information. The memory 620 may include volatile memory, such as volatile Random Access Memory (RAM) including a cache area for the temporary storage of data. The memory 620 may also include non-volatile memory, which can be embedded and/or may be removable. The non-volatile memory can additionally or alternatively include an electrically erasable programmable read-only memory (EE-PROM), flash memory or the like. In some embodiments, the memory 620 operates as a memory device like the memory devices 250, 350, and 450 described above.

The memory 620 can store any of a number of applications which comprise computer-executable instructions/code executed by the processor 610 to implement the functions of the mobile device 600 and/or one or more of the process/method steps described herein. For example, the memory 620 may include such applications as a conventional web browser application 622 and/or a financial institution application 621. These applications also typically provide a graphical user interface (GUI) on the display 630 that allows the first user 101 to communicate with the mobile device 600, the managing entity system 200, and/or other devices or systems. In one embodiment of the invention, when the user 101 decides to utilize the managing entity system application 621 program, the user 101 downloads, is assigned, or otherwise obtains the managing entity system application 621 from the managing entity system 200, or from a distinct application server. In other embodiments of the invention, the user 101 interacts with the managing entity system 200, computing devices 700, and/or third party systems 145, via the web browser application 622 in addition to, or instead of, the managing entity system application 621.

The memory 620 can also store any of a number of pieces of information, and data, used by the mobile device 600 and the applications and devices that make up the mobile device 600 or are in communication with the mobile device 600 to implement the functions of the mobile device 600 and/or the other systems described herein. For example, the memory 620 may include such data as user authentication information, threat intelligence data, threat-based exposure modeling data, and the like.

Referring now to FIG. 7, a flowchart is provided to illustrate one embodiment of a process 700 for monitoring and addressing events based on triplet metric analysis. In some embodiments, the process 700 may include block 702, where the system continuously monitors a vendor database for a new data input comprising at least a threat actor, a threat means, and a targeted asset.

As used herein, a "threat actor" refers to an individual, group of individuals, organization, or other entity that has performed or is anticipated to perform certain actions (e.g., an "event") upon a certain asset of the managing entity. The processes, methods, or instruments that may be used by the threat actor to perform these certain actions are considered the "threat means." The "targeted asset" is an asset, property, or other resource owned or managed by the managing entity that may be acted upon by the threat actor, by use of one or more of the threat means. Each identified or predicted event will have a threat actor-means-asset combination that can be analyzed by the system.

The vendor database may be any database or database system that provides, receives, and/or stores threat intelligence-based information. The threat intelligence-based information may be in the form of reports, messages, electronic messages, physical letters, images of reporting letters, intelligence data spreadsheets, and the like. These reports may be provided by one or more third party vendors, may be generated and provided by agents of the managing entity, may be extracted from publicly available information databases (e.g., government reports, government records, public forums, and the like), extracted from social media websites, or a combination thereof.

The threat intelligence-based information from the reports may be generally unformatted text, such as prose-form email messages. In some embodiments, the system may extract data from the reports based on keyword searches, data value searches, data thresholds, and the like. In some embodiments, the system may use an optical character recognition (OCR) process to identify words, images, symbols, and the like, from the reports. In some embodiments, the OCR process used by the system is configured to specialize in identifying language, images, symbols, and the like that are directed to threat intelligence data management.

In some embodiments, the threat intelligence-based information may be generally unformatted, but may include "data tags," or predetermined key words or values that are known by the managing entity system (e.g., stored in a data tag database). In such embodiments, third party vendors may add data tags to their reports when the reports are entered into the vendor database system and/or transmitted directly to the managing entity system (e.g., via email, via physical mail, via an internet application, and the like). Examples of data tags for a report on an event that has been identified as being associated with threat intelligence (e.g., a past event, an ongoing event, or a predicted future event) include, but are not limited to, a date of the event, a time of the event, a duration of the event, one or more threat actors, one or more threat means, one or more targeted assets, and the like.

In addition to the threat intelligence-based data, the input data may include statistics and/or estimations of the threat intelligence-based data. In other embodiments, the threat intelligence database system 300, once it receives the input data, may calculate certain statistics and/or estimations based on the threat intelligence-based input data. These statistics and estimates may be generated based on the data tags, and/or extracted key words or data points. Examples of these statistics and estimates include, but are not limited to, estimations of the event for each known threat actor-means-asset combination as a percentage of the entire population of events, and counts of the incidence of each threat actor-means-asset combination, grouped by predetermined time periods (e.g., one day, one month, one year, five years, and the like). As such, the vendor data feeds and/or the threat intelligence data management systems may identify and/or provide useful information for the system to apply to trending models, overview models, and the like.

In some embodiments, the vendor database provides the new threat-based information as a data feed to the managing entity system, such that new threat intelligence-based information is automatically transferred directly to the managing entity system in real time or substantially in real time as the information is identified and/or recorded as a report in the vendor database. While the term vendor database is used to describe where threat intelligence data is identified and/or analyzed, it should be known that this threat intelligence data may be analyzed within, extracted from, and/or received from a vendor database system (e.g., the vendor database system 400 in FIG. 1) and/or a general threat intelligence database system (e.g., the threat intelligence database system 300 in FIG. 1).

In some embodiments, the threat intelligence data input channels of the threat intelligence database system 300 and the vendor database system 400 are configured as spokes in a hub and spoke system, where the hub is comprised of at least a portion of the remaining system environment 100 (i.e., the managing entity system 200, the computing devices 500, the mobile devices 600, and the third party systems 110). In various embodiments, only one threat intelligence data input channel is used, while in some cases, multiple input channels are used (including other database systems that are not shown in FIG. 1).

In some cases, only those input channels with relevant information is used. This may be determined based on user input or based on communications from spoke control systems such as the managing entity system's 200 server sending instructions to the hub system to configure and/or activate a communication channel with a spoke system so that relevant information may be communicated across the channel. In some cases, when the spoke control system detects that new information or otherwise relevant information may be available at one or more spoke systems, the spoke control system sends control signals that cause the hub system to establish a dedicated communication channel between the hub system and the one or more spoke systems that may have relevant information.

In some cases, the dedicated communication channel is optimized so that the information may be communicated more efficiently than it could be over a non-dedicated communication channel. For example, a non-dedicated communication channel may utilize insecure network connections or systems or may utilize unstable or noise-prone network connections or systems. Thus, when establishing a dedicated communication channel, the hub system may optimize parameters of the dedicated communication channel such that the communication channel is less prone to interruption from security breach, other traffic, offline systems or the like. This may be done by, for example, designating certain systems on the network between the hub system and the various spoke systems, respectively, as low-functioning, medium-functioning, or high-functioning network systems, hubs, connections, and/or channels (collectively referred to as network systems).

In various other embodiments, the number of categories of systems may be raised or lowered. For example, there may be five (5) distinct categories of systems. The various network systems may be categorized by one or more administrators and/or automatically based on one or more monitoring modules or applications running on the hub and/or spoke systems. Such a monitoring system may flag any abnormalities in network communication such as an unintended offline network system, a security breach of a network system, a network communication affected negatively by noise or interference (in some cases based on a predetermined threshold of interference or communication errors). Thus, once various network systems are categorized, the spoke control systems and/or the hub system may optimize the dedicated communication channel by selecting appropriately categorized network systems for the communication channel. For example, the hub system may establish a dedicated communication channel in order to receive information associated with high priority work (as indicated by a spoke control system, for example, in its control signals to the hub system).

When establishing the dedicated communication channel, the hub system may only select high-functioning network systems in order to ensure that the high priority information may be reliably communicated from the spoke system(s) to the hub system. In another example, certain spoke systems are designated or categorized and always provided a dedicated (or non-dedicated) communication channel based on their respective categorization.

In some embodiments, the system can access, retrieve, extract, or otherwise use threat management data that is stored in the threat intelligence database system 300 of the system 100. The threat intelligence database system 300 may store information and data associated with previously identified and analyzed events, as well as analytics provided by agents of the managing entity and/or third party vendors. The analytics may be based on analysis of previous events, industry expertise, assumptions, and the like. Any values provided in the analytics may be based on predetermined algorithms, assumptions, agent-determined values (e.g., estimates based on experience and expertise in threat intelligence analysis), and the like.

One example of the threat intelligence-based analytics is determined threat actor basic qualities (e.g., age, geographical region, technical ability, preferred means for carrying out an event, preferred assets to target during an event, frequency of events associated with the actor, known or suspected aliases, known or suspected co-actors, organizational involvement, and the like).

Another example of threat intelligence-based analytics is a quantitative evaluation of known threat actors' capabilities on a scale that has been standardized with respect to the totality of the known threat actors. In some embodiments, an agent of the managing entity and/or a third party vendor may analyze data associated with a known threat actor and determine the quantitative value for the known threat actor's capabilities based on the known data and the expertise of the agent. In other embodiments, the system may process each known actor through an algorithm to determine a quantitative value for each known actor, with respect to the totality of threat actors known to the system. The quantitative evaluation for each known threat actors' capabilities can be recorded and stored as a threat actor value for the respective threat actor known by the system, in a database such as an actor value database. This threat actor value can be used by the system as described in block 706. The threat actor value may be a percentage, a value on a scale between a lower limit and an upper limit (as determined by the system), a fraction, and the like.

In some embodiments, the system may receive input data that refers to a new, or previously unknown threat agent. In such embodiments, the system may have a threat-intelligence-based analytic of a quantitative evaluation of a generic threat actor's capabilities. For example, a general assumption can be made by an expert in threat intelligence analysis and entered into the threat intelligence database system.

Alternatively, the system may have an algorithm with generic values for a number of variables (e.g., age, geographical region, organizational involvement or association, and the like), and the system can replace the generic variables with information extracted from the input data to produce the quantitative evaluation of the new actor's capabilities.

The threat actor value is represented as the vector "a" in FIG. 8, where the length of the vector a is equal to the threat actor value as determined by the quantitative evaluation of a single threat actor's capabilities on the standardized scale. As the identified and/or evaluated capabilities of the threat actor increase, the length of vector a will also increase. Similarly, as the identified and/or evaluated capabilities of the threat actor decreases, the length of vector a will also decrease.

Referring again to block 702 of FIG. 7, another example of the threat intelligence-based analytics is a quantitative evaluation of a known threat means' effectiveness on a scale that has been standardized with respect to all known threat means. As with the quantitative evaluation of the actor's capabilities, the quantitative evaluation of the known threat means' effectiveness may be a general assumption or estimation determined by an expert in threat intelligence analysis and entered into the threat intelligence database system.

Additionally or alternatively, and as with the quantitative evaluation of the actors' capabilities, one or more algorithms may be used to determine a known threat means' effectiveness with respect to the totality of known threat means. For example, the system may have a scale from 1 to 10, where threat means that are most effective have values closer to 10 than the threat means that are less effective. Of course, the 1 to 10 scale is merely an example, and any standardized scale may be used (e.g., percentage, fraction, scales between different numbers, and the like). This quantitative evaluation of the effectiveness of a known threat means can be recorded as a threat means value for that known threat means, and the threat means values for every known threat means can be stored in a database such as a threat means value database. This threat means value may be utilized by the system, as described in block 708.

The threat means value is represented as the vector v in FIG. 8 where the length of the vector v is equal to the threat means value as determined by the quantitative evaluation of a single threat means' effectiveness on the standardized scale. As the identified and/or evaluated effectiveness of the specific threat means increase, the length of vector v will also increase. Similarly, as the identified and/or evaluated capabilities of the threat actor decreases, the length of vector a will also decrease.

While determining threat actor values and threat means values are beneficial in understanding an exposure of an asset of the managing entity, it is important to understand the relationship between a specific threat actor and a specific threat means. Therefore, the managing system may determine a quantitative estimation of a specific threat actor's history and capability in utilizing a known threat means. This quantitative estimation can be based on historical data associated with the threat actor, based on keywords and data tags that indicate how many times the threat actor has used a specific threat means or a similar threat means, what percentage of the time the threat actor utilizes the threat means or a similar threat means, trends in which threat means are utilized by the threat actor, the most recent threat means utilized by the threat actor, the threat actor's effectiveness in utilizing the threat means, and the like.

This estimation can be determined by using algorithms that take these factors into account, by presenting these factors to one or more experts in threat intelligence analysis, or a combination of the two. The resulting value can be represented as a degree of relation between the specific threat actor and the specific threat means. This degree of relationship between the specific threat actor and the specific threat means is represented by the angle "θ" between the vector a (the threat actor value) and the vector v (the threat means value) in FIG. 8. In some embodiments, this degree of relation between the specific threat actor value and the specific threat means value can be a value in degrees between 0 and $\pi/2$, where a value close to 0 indicates that the threat actor has little experience and/or limited capabilities in utilizing the specific threat means, and where a value close to $\pi/2$ indicates that the threat actor has a lot of experience and/or is very capable in utilizing the specific threat means.

For each known combination of threat actor and threat means, the system may calculate a "total threat value" as the cross product between the respective vectors for each specific threat actor value (i.e., vector a) and each specific threat means value (i.e., vector v). This total threat value is represented as vector "T" in FIG. 8, and the length of vector T correlates with the strength of a specific threat actor in using the specific threat means.

The threat intelligence database system 300 may also store a record of every asset and/or asset type is owned or otherwise managed by the managing entity, and that is a potential target of a threat actor utilizing a threat means. This record of assets may be stored in a target asset database within the intelligence database system 300 such that the managing entity has access to, can extract, or otherwise can use the asset data in the implementation of the process 700. In some embodiments, the target asset database is stored within the managing entity system 200 and/or the third party system 110.

The intelligence database system 300 may also store a record of quantitative evaluations of inherent exposure potential for each asset of the target assets, where each quantitative evaluation of asset exposure potential is a targeted asset value within a standardized scale. In some embodiments, the system automatically determines the targeted asset value based on one or more algorithms that analyze historical data associated with the targeted asset. In other embodiments, an agent of the managing entity, or a third party vendor's agent may be provided with the historical data associated with the targeted asset, and the agent determines a targeted asset value based on this historical data and the expertise of the agent in threat intelligence analysis.

As with the threat actor analysis, the system may store generic exposure potential data for one or more asset groups or asset types, such that a newly identified asset can have an estimated targeted asset value, based on the generic exposure potential for that asset's grouping or classification. As the new asset has been analyzed one or more times, the generic data can be replaced with date from real-world application and/or analysis.

This targeted asset value is represented as vector b in FIG. 8, where the length of vector b is correlated with the amount of threat exposure for the asset. Therefore, as the amount of threat exposure increases, the targeted asset value increases, and the length of the vector b increases. Likewise, as the amount of threat exposure decreases, the targeted asset value decreases, and the length of vector b decreases.

Finally, the intelligence database system 300 may store a record of quantitative evaluations of the degree of exposure of each targeted asset with respect to the calculated total threat (i.e., vector T in FIG. 8) for each combination of threat actors and threat means. This degree of a targeted asset's exposure to a total threat can be automatically calculated by the system based on historical data and input data related to the specific targeted asset, and its relationship and/or susceptibility to a known combination of a threat actor and threat means. Additionally or alternatively, an agent of the managing entity and/or a third party can determine the degree of exposure for a targeted asset with respect to a known total threat based on historical data that is provided to the agent and the expertise of the agent in threat intelligence analysis. Again, estimated values may be assigned to a new or relatively new targeted asset's degree of exposure to a known total threat based on the degree of exposure to the known total threat of a similar targeted asset, and/or based on a generic value for new targeted assets' exposure to a total threat. As more information associated with the targeted asset and its relationship with the known total threat, the system can replace estimated or generic assumptions in its algorithm for determining the degree of exposure for the targeted asset.

This degree of exposure of the a targeted asset to a known total threat is represented by the angle "φ" between the vector b (i.e., the targeted asset value) and the vector T (i.e., the total threat for a known threat actor and threat means combination) in FIG. 8. In some embodiments, the value of the angle φ is between 0 and $\pi/2$, where a value of the angle φ that is close to 0 represents a degree of exposure for the targeted asset relative to the combined threat actor and threat means that is very low, and where a value of the angle φ that is closer to π/2 represents a degree of exposure for the targeted asset relative to the combined threat actor and threat means that is more significant. As such, the degree of exposure of a threatened asset relative to total threat may be standardized relative to other targeted assets or other total threats on a scale between 0 and π/2. The degree of exposure value for each known threatened asset relative to each known total threat may be stored in a database within the managing entity system 200, the threat intelligence database system 300, the vendor database system 400, and/or a third party system 110, such that the managing entity system may access, extract, analyze, or otherwise use the degree of exposure value during the process 700, and particularly with respect to block 712.

In some embodiments, the process 700 includes step 704, where the system, based on monitoring the vendor database, identifies the new data input. As described above, the system may be constantly monitoring the vendor database and/or other databased for new data (e.g., reports, tagged reports, messages, and the like), such that the system can identify that at least one new piece of input data has been stored in the vendor database. Additionally or alternatively, the system may transmit control signals configured to cause the vendor database to automatically transmit new input data (or a notification of the presence of new input data) to the system as new input data is received and/or recorded by the vendor database system. As such, the system may receive the new data input directly from the vendor database, or the system may actively access the vendor database to retrieve the new input data.

As described above, each set of new input data will list or be associated with, at least one of a threat actor, a threat means, and a targeted asset. As such, the system can identify the specific threat actor of the new input data, the specific threat means used (or expected to be used) by the threat actor of the new input data, and the targeted asset of the new input data.

Additionally, in some embodiments, the process 700 includes block 706, where the system identifies a threat actor value based on a comparison of the threat actor to an actor value database. As the system has identified the threat actor associated with the received input data, the system can perform a key word search within the threat actor value database to determine a match between the identified threat actor and its associated threat actor value. As described above, in embodiments where the identified threat actor is a new or unknown threat actor, the system may assign an estimated or conservative threat actor value to the identified threat actor, or the system may assign estimated or conservative values to variables of its algorithm for determining a threat actor value. Additionally, in some embodiments, the input data may include a threat actor value assigned by an agent of the managing entity or a third party, and this assigned threat actor value may be added to the threat actor value database. The identified targeted asset value may be stored as the vector a for use in calculation steps of the system (e.g., with respect to block 712).

The process 700 may also include block 708, where the system identifies a threat means value based on a comparison of the threat means to a means value database. As the system has identified the threat means associated with the received input data, the system can perform a key word search within the threat means value database to determine a match between the identified threat means and its associated threat means value. As described above, in embodiments where the identified threat means is a new or unknown threat means, the system may assign an estimated or conservative threat means value to the identified threat means, or the system may assign estimated or conservative values to variables of its algorithm for determining a threat means value. Additionally, in some embodiments, the input data may include a threat means value assigned by an agent of the managing entity or a third party, and this assigned threat means value may be added to the threat means value database. The identified threat means value may be stored as the vector v for use in calculation steps of the system (e.g., with respect to block 712).

In some embodiments, the process 700 includes block 710, where the system identifies a targeted asset value based on a comparison of the targeted asset to an asset value database. As the system has identified the targeted asset associated with the received input data, the system can perform a key word search within the targeted asset value database to determine a match between the identified targeted asset and its associated targeted asset value. As described above, in embodiments where the identified targeted asset is a new or unknown targeted asset, the system may assign an estimated or conservative targeted asset value to the identified targeted asset, or the system may assign estimated or conservative values to variables of its algorithm for determining a targeted asset value. Additionally, in some embodiments, the input data may include a targeted asset value assigned by an agent of the managing entity or a third party, and this assigned targeted asset value may be added to the targeted asset value database. The identified targeted asset value may be stored as the vector b for use in calculation steps of the system (e.g., with respect to block 712).

Furthermore, while not listed with respect to FIG. 7, the system may also identify and/or calculate the degree of relation between the identified threat actor and the identified threat means (i.e., the angle θ in FIG. 8). To accomplish this task, the system may compare the combination of the identified threat actor and the identified threat means with a degree of relation value database that has degree of relationship values for every known combination of threat actors and threat means. The identified degree of relation value may be stored as the angle θ for use in calculation steps of the system (e.g., with respect to block 712).

The system may also identify and/or calculate the degree of exposure of the identified targeted asset relative to the total threat of the identified threat and the identified threat means (i.e., the angle φ in FIG. 8). To accomplish this task, the system may compare the combination of the identified threat means to the identified total threat (i.e., the combination of the identified threat actor and the identified threat means) with a degree of exposure value database that has degree of exposure values for every known combination of threat actors, threat means, and targeted assets. The identified degree of exposure value may be stored as the angle φ for use in calculation steps of the system (e.g., with respect to block 712).

Additionally, in some embodiments, the process 700 includes block 712, where the system calculates a threat-based exposure model based at least on the identified threat actor value, the identified threat means value, and the identified targeted asset value. As such, the system may calculate the threat-based exposure model using the vector a, the vector v, the vector b, the angle θ, and the angle φ. In some embodiments, the calculation of a threat-based exposure model comprises a parallelepiped with a volume (R) is defined as "R=|a v b| sin(θ) sin(φ)," where a is the identified threat actor value, v is the identified threat means value, b is the identified targeted asset value, θ is the identified degree of relation value (i.e., the degree of relation between the identified threat actor and the identified threat means), and φ is the identified degree of exposure value (i.e., the degree of relation between the identified targeted asset and the combination of the identified threat actor and the identified threat means). The volume R of the parallelepiped may be considered the threat-based exposure value for the specific combination of the identified threat actor, the identified threat means, and the identified targeted asset.

In some embodiments, the process 700 may include block 714, where the system, in response to calculating the threat-based exposure model, transmits control signals configured to cause a computing device system associated with a user to display a three-dimensional representation of the threat-based exposure model. As the threat-based exposure model uses a triplet metric analysis and generates a three dimensional model of a parallelepiped, the display of the triplet metric may be a three dimensional display or a variable two-dimensional display. For example, in some embodiments, the system may display the threat-based exposure model of the parallelepiped on a two-dimensional display of a user interface of a computing device of a user. However, the two-dimensional display and the user interface as a whole may have the capabilities of changing a viewing angle of the parallelepiped threat-based exposure model, such that features like the length of each vector a, v, and b, and the angles of θ and φ may be easily viewed and analyzed at a single point in time and/or over a period of time as the model is dynamically updated by the system.

In some embodiments, the system may display the parallelepiped threat-based exposure model to a user as a virtual reality representation of the threat-based exposure model, where the computing device associated with the user comprises a virtual reality device. For example, the system may transmit control signals to a virtual reality headset of a user, where the control signals are configured to display the threat-based exposure model to the user in a three dimensional space, where the user can change viewing angles and/or the size of the threat-based exposure model based on angles and movements of the virtual reality headset. In some embodiments, the virtual reality headset is a holographic headset that transposes the digitally produced threat-based exposure model within the physical environment of the user.

Additionally, in some embodiments, the system may cause a computing device to project the three dimensional threat-based exposure model such that it may be viewed in a physical environment by one or more users. For example, the system may cause a laser-based holographic device to display the parallelepiped of the threat-based exposure model in three dimensions.

Additionally, the system may physically display the threat-based exposure model. For example, in some embodiments, the system may receive, from a user interface of a computing device associated with the user, instructions to print the threat-based exposure model. In response to receiving the instructions to print the threat-based exposure model, the system may transmit control signals configured to cause a three-dimensional printer system to print the threat-based exposure model. As such, the system may produce physical versions of the threat-based exposure model that may be held, analyzed, and compared to other threat-based exposure models.

In some embodiments, the steps represented in blocks 702 through 714 may be repeated with every piece of received input data, such that the display of the threat-based exposure model is dynamically updated in real time, or substantially in real time, as the system identifies new threat intelligence information. In some embodiments, each threat-based exposure model is time-stamped based on when the event occurred and/or when the event is reported in new input data, and one or more of the threat actor value, the threat means value, the targeted asset value, the degree of relation between the threat actor, and/or the degree of exposure between the targeted asset and the combination of the threat actor and the threat means can decrease based on a time-based algorithm as a function of the distance in time from when the model was time-stamped. As such, a threat-based exposure model for one actor-means-asset combination may slowly decrease in value without any additional input or analysis of new input data. In such embodiments, threat-based exposure models associated with newer input data is given greater weighting based on the fact that events have occurred more recently than other data.

In some embodiments, the displayed threat-based exposure model is a single parallelepiped 800, as shown in FIG. 8. FIG. 8 illustrates one representation of how the threat-based exposure model (i.e., the displayed parallelepiped) may be presented to one or more users. As shown in FIG. 8, the threat actor value associated with the identified threat actor is represented as the vector a, the threat means value associated with the identified threat means is represented as the vector v, the degree of relation between the identified threat actor and the identified threat means is represented as the angle θ, the total threat exposure (i.e., the total threat exposure for the combination of the identified threat actor and the identified threat means) is represented as the vector T, the targeted asset value associated with the identified targeted asset is represented as the vector b, and the degree of exposure of the identified targeted asset relative to the combination of the identified threat actor and the identified threat means is represented as the angle φ. In some embodiments, the vector T is not displayed. Additionally, in some embodiments, the actual vectors may not be presented on the actual parallelepiped, but may be presented in a key or legend as definitions of axes in the three dimensional space.

By displaying the threat-based exposure model as a parallelepiped, the system allows users to more easily understand the potential for exposure of the targeted asset of the managing entity, based on the identified threat actor using the identified threat means to target the targeted asset. While a threat actor value or the vector a, by itself, indicates the general capabilities of the threat actor, the one-dimensional representation of the threat actor does not provide an accurate and comprehensive view of how capable the identified threat actor actually is at using the identified threat means to target the identified targeted asset. Therefore, by illustrating the relationships between the threat actor, the threat means, and the targeted asset as visible angles, the system is providing a more comprehensive representation of how effective a specific threat actor is expected to be when using a specific threat means to target a specific targeted asset.

Additionally, as the volume of the threat-based exposure model represents a threat-based exposure value for the specific actor-means-asset combination, an increase in any of the vectors a, v, and/or b, and/or any of the angles θ and/or φ will increase the volume of the parallelepiped threat-based exposure model, and therefore will increase the threat-based exposure value. Likewise, a decrease in any of the vectors a, v, and/or b, and/or any of the angles θ and/or φ will decrease the volume of the parallelepiped threat-based exposure model, and therefore will decrease the threat-based exposure value. In embodiments where the displayed threat-based exposure model is dynamically updated with new input data, the changes in volume of the parallelepiped will be easily identifiable as the vector lengths and/or angle sizes change with the updated model. In some embodiments, the actual values of the vectors a, v, b, and/or T, and/or any of the angles θ and/or φ can be presented on the display.

In some embodiments, the system may record and store the threat-based exposure models for each actor-means-asset combination in an exposure model database. As such, the system may simultaneously display multiple threat-based exposure models to one or more users. One embodiment of a display 900 of multiple threat-based exposure models is presented in FIG. 9. As shown in FIG. 9, twenty different threat-based exposure models (i.e., models 1 through 20) are presented at the same time. In such embodiments, the threat-based exposure model for each actor-means-asset combination can be compared to the other models, such that a user can identify the most important actor-means-asset combinations to monitor or address, any potential correlations between distinct actor-means-asset combinations, and the like.

Any number of threat-based exposure models may be presented at the same time, and the system can display the threat-based exposure models with based on certain filtering criteria. For example, the system can display every threat-based exposure model for actor-means-asset combinations that have the same threat actor. As such, a user can better visualize the threat actor's strengths and weaknesses as well as which targeted assets of the managing entity should be monitored for protection against the threat actor.

Additionally, multiple threat-based exposure models can be presented based on other criteria such as geographical regions associated with threat actors or targeted assets, organizational affiliations of threat actors, departmental associations of targeted assets within the managing entity, motives of threat actors, types of threat actors, types of threat means, types of targeted assets, and the like. In some embodiments, multiple criteria can be visualized on a single display by color-coding the distinct threat-based exposure models. For example, threat-based exposure models for targeted assets located in a first geographical region may be colored blue while the threat-based exposure models for targeted assets located in a second geographical region may be colored green. As such, the display may present a threat-based exposure heat map across one or more groupings of threat-based exposure models for certain actor-means-asset combinations.

In some embodiments, and as illustrated in FIG. 10, multiple threat-based exposure models may be presented together in a stacked, or grouped representation 1000. In such embodiments, a total threat-based exposure of the presented models may be viewed and analyzed. For example, the system may group every determined threat-based exposure model together in one display, such that a total threat-based exposure model of every known actor-means-asset combination can be analyzed as a whole. Additionally, a total threat-based exposure value can be calculated as the sum of the volume of each known threat-based exposure model. Again, as new input data is received and analyzed by the system, the displayed total threat-based exposure model can be dynamically updated to illustrate the changes to the threat-based exposure landscape of every known actor-means-asset combination in real time, or in substantially real time. As such, trends in the threat-based exposure can be identified and used to forecast future exposure potential for certain actor-means-asset combinations. Of course, any grouping of threat-based exposure models may be displayed, and any group-based total threat-based exposure value may be calculated as the sum of the volumes of the individual threat-based exposure models that comprise the group.

Additionally, as the threat-based exposure models effectively utilize volume-based analytical measurements, the thermodynamic qualities of threat-based exposure can be analyzed in the same manner as volume changes in other environments. For example, as solid volumes grow or shrink, the energy associated with those solid volumes fluctuates. Therefore, the calculations, principles, and laws of thermodynamics can be utilized to measure, analyze, and predict trends of threat-based exposure model growth over time. These fluctuations can be easily analyzed using the threat-based exposure models described herein, and therefore can provide meaningful measurements of the threat-based exposure landscape. Analogs to entropy, thermal contact, and other thermodynamic processes can yield insight into control efficiency, control gaps, and other trends that can have real operational outcomes for a managing entity.

In some embodiments, the threat-based exposure models can be used to support regulatory compliance requirements. For example, rankings of the threat actor values, threat means values, and/or targeted asset values can be extracted to identify key actors, means, and/or assets for regulatory compliance reporting.

In some embodiments, Monte-Carlo style sampling can be utilized to simulate and analyze multiple threat-based exposure events based on the determined threat-based exposure models. Exposure-curves based on the determined threat-based exposure models can be calculated and stored in an exposure-curve database for future comparison. As such, actual input data can be compared to the stored exposure-curves to determine anomalies in threat-based exposure activity. These anomalies can automatically be identified and flagged for additional review by one or more agents of the managing entity and/or a third party. As such, the system can perform accuracy checks on itself to help ensure that the analyzed results are as close as possible to the real-world environment.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for monitoring and addressing events based on triplet metric analysis, the system comprising:
one or more memory devices; and
one or more processing devices operatively coupled to the one or more memory devices, wherein the one or more processing devices are configured to execute computer-readable program code to:
transmit control signals to cause a vendor database system to continuously monitor a vendor database for a new data input and, in response to identifying the new data input, automatically transmit the new data input to the system, wherein the new data input comprises at least a threat actor, a threat means, and a targeted asset;
receive the new data input from the vendor database system, wherein the new data input comprises unformatted text of prose-form messages;
apply an optical character recognition process to the unformatted text of prose-form messages to extract and identify the threat actor, the threat means, and the targeted asset;
identify a threat actor value based on a comparison of the threat actor to an actor value database, wherein the threat actor value comprises a scalar representation of capabilities of the threat actor;
identify a threat means value based on a comparison of the threat means to a means value database, wherein the threat means value comprises a scalar representation of effectiveness of the threat means;
identify a targeted asset value based on a comparison of the targeted asset to an asset value database, wherein the targeted asset value comprises a scalar representation of exposure potential of the targeted asset;

calculate a threat-based exposure value with a threat-based exposure model that is based at least on the identified threat actor value, the identified threat means value, and the identified targeted asset value, wherein the threat-based exposure model comprises:

$$R=|avb|\sin(\theta)\sin(\varphi)$$

wherein:
R is the threat-based exposure value calculated with the threat-based exposure model;
a is the identified threat actor value;
v is the identified threat means value;
b is the identified targeted asset value;
θ is a degree of relation between the threat actor and the threat means; and
φ is a degree of relation between the targeted asset and a combination of the identified threat actor and the identified threat means;

calculate a total threat-based exposure value as a sum of R and a plurality of different threat-based exposure values associated with different combinations of threat actors, threat means, and targeted assets;

in response to calculating the threat-based exposure value, transmit control signals configured to cause a computing device system associated with a user to display a three-dimensional representation of the threat-based exposure model;

receive, from the user interface of the computing device system associated with the user, instructions to print the threat-based exposure model; and in response to receiving instructions to print the threat-based exposure model, transmit control signals configured to cause a three-dimensional printer system to print the threat-based exposure model.

2. The system of claim 1, wherein the three-dimensional representation of the threat-based exposure model comprises a two-dimensional display of the threat-based exposure model, wherein a vantage point of the threat-based exposure model is moveable about the two-dimensional display.

3. The system of claim 1, wherein the three-dimensional representation of the threat-based exposure model comprises a virtual reality representation of the threat-based exposure model, and wherein the computing device system associated with the user comprises a virtual reality device.

4. The system of claim 1, wherein the one or more processing devices are configured to, in response to calculating the total threat-based exposure value, transmit control signals configured to cause the computing device system associated with the user to display a three-dimensional representation of the total threat-based exposure value.

5. A computer program product for monitoring and addressing events based on triplet metricanalysis, the computer program product comprising at least one non-transitory computer readable medium comprising computer readable instructions, the instructions comprising instructions for:

transmitting control signals to cause a vendor database system to continuously monitor a vendor database for a new data input and, in response to identifying the new data input, automatically transmit the new data input to the system, wherein the new data input comprises at least a threat actor, a threat means, and a targeted asset;

receiving the new data input from the vendor database system, wherein the new data input comprises unformatted text of prose-form messages;

applying an optical character recognition process to the unformatted text of prose-form messages to extract and identify the threat actor, the threat means, and the targeted asset;

identifying a threat actor value based on a comparison of the threat actor to an actor value database, wherein the threat actor value comprises a scalar representation of capabilities of the threat actor;

identifying a threat means value based on a comparison of the threat means to a means value database, wherein the threat means value comprises a scalar representation of effectiveness of the threat means;

identifying a targeted asset value based on a comparison of the targeted asset to an asset value database, wherein the targeted asset value comprises a scalar representation of exposure potential of the targeted asset;

calculating a threat-based exposure value with a threat-based exposure model that is based at least on the identified threat actor value, the identified threat means value, and the identified targeted asset value, wherein the threat-based exposure model comprises:

$$R=|avb|\sin(\theta)\sin(\varphi)$$

wherein:
R is the threat-based exposure value calculated with the threat-based exposure model;
a is the identified threat actor value;
v is the identified threat means value;
b is the identified targeted asset value;
θ is a degree of relation between the threat actor and the threat means; and
φ is a degree of relation between the targeted asset and a combination of the identified threat actor and the identified threat means;

calculating a total threat-based exposure value as a sum of R and a plurality of different threat-based exposure values associated with different combinations of threat actors, threat means, and targeted assets;

in response to calculating the threat-based exposure value, transmitting control signals configured to cause a computing device system associated with a user to display a three-dimensional representation of the threat-based exposure model;

receiving, from the user interface of the computing device system associated with the user, instructions to print the threat-based exposure model; and in response to receiving instructions to print the threat-based exposure model, transmitting control signals configured to cause a three-dimensional printer system to print the threat-based exposure model.

6. The computer program product of claim 5, wherein the three-dimensional representation of the threat-based exposure model comprises a two-dimensional display of the threat-based exposure model, wherein a vantage point of the threat-based exposure model is moveable about the two-dimensional display.

7. The computer program product of claim 5, wherein the three-dimensional representation of the threat-based exposure model comprises a virtual reality representation of the threat-based exposure model, and wherein the computing device system associated with the user comprises a virtual reality device.

8. The computer program product of claim 5, wherein the computer readable instructions further comprise instructions, in response to calculating the total threat-based exposure value, transmitting control signals configured to cause the computing device system associated with the user to display a three-dimensional representation of the total threat-based exposure value.

9. A computer implemented method for monitoring and addressing events based on triplet metric analysis, said computer implemented method comprising:

transmitting control signals to cause a vendor database system to continuously monitor a vendor database for a new data input and, in response to identifying the new data input, automatically transmit the new data input to the system, wherein the new data input comprises at least a threat actor, a threat means, and a targeted asset;

receiving the new data input from the vendor database system, wherein the new data input comprises unformatted text of prose-form messages;

applying an optical character recognition process to the unformatted text of prose-form messages to extract and identify the threat actor, the threat means, and the targeted asset;

identifying a threat actor value based on a comparison of the threat actor to an actor value database, wherein the threat actor value comprises a scalar representation of capabilities of the threat actor;

identifying a threat means value based on a comparison of the threat means to a means value database, wherein the threat means value comprises a scalar representation of effectiveness of the threat means;

identifying a targeted asset value based on a comparison of the targeted asset to an asset value database, wherein the targeted asset value comprises a scalar representation of exposure potential of the targeted asset;

calculating a threat-based exposure value with a threat-based exposure model that is based at least on the identified threat actor value, the identified threat means value, and the identified targeted asset value, wherein the threat-based exposure model comprises:

$$R = |avb|\sin(\theta)\sin(\varphi)$$

wherein:
R is the threat-based exposure value calculated with the threat-based exposure model;
a is the identified threat actor value;
v is the identified threat means value;
b is the identified targeted asset value;
$\theta$ is a degree of relation between the threat actor and the threat means; and
$\varphi$ is a degree of relation between the targeted asset and a combination of the identified threat actor and the identified threat means;

calculating a total threat-based exposure value as a sum of R and a plurality of different threat-based exposure values associated with different combinations of threat actors, threat means, and targeted assets in response to calculating the threat-based exposure value, transmitting control signals configured to cause a computing device system associated with a user to display a three-dimensional representation of the threat-based exposure model;

receiving, from the user interface of the computing device system associated with the user, instructions to print the threat-based exposure model; and in response to receiving instructions to print the threat-based exposure model, transmitting control signals configured to cause a three-dimensional printer system to print the threat-based exposure model.

10. The computer implemented method of claim 9, wherein the three-dimensional representation of the threat-based exposure model comprises a two-dimensional display of the threat-based exposure model, wherein a vantage point of the threat-based exposure model is moveable about the two-dimensional display.

11. The computer implemented method of claim 9, wherein the three-dimensional representation of the threat-based exposure model comprises a virtual reality representation of the threat-based exposure model, and wherein the computing device system associated with the user comprises a virtual reality device.

12. The computer implemented method of claim 9, wherein the computer implemented method further comprises instructions, in response to calculating the total threat-based exposure value, transmitting control signals configured to cause the computing device system associated with the user to display a three-dimensional representation of the total threat-based exposure value.

* * * * *